July 13, 1965 J. RABINOW 3,194,371
MAGNETIC TORSIONAL OVERLOAD CLUTCH
Filed April 29, 1963 3 Sheets-Sheet 1

INVENTOR
Jacob Rabinow

BY Joseph A. Genovese &
Max L. Libman

ATTORNEYS

July 13, 1965                J. RABINOW                3,194,371
                  MAGNETIC TORSIONAL OVERLOAD CLUTCH
Filed April 29, 1963                                3 Sheets-Sheet 2

INVENTOR
Jacob Rabinow

BY Joseph A. Genovese &
   Mat L. Libman

ATTORNEYS

July 13, 1965  J. RABINOW  3,194,371
MAGNETIC TORSIONAL OVERLOAD CLUTCH
Filed April 29, 1963  3 Sheets-Sheet 3

INVENTOR
Jacob Rabinow

BY Joseph A. Genovese
Mat L. Libman

ATTORNEYS

United States Patent Office 3,194,371
Patented July 13, 1965

3,194,371
MAGNETIC TORSIONAL OVERLOAD CLUTCH
Jacob Rabinow, Bethesda, Md., assignor, by mesne assignments, to Control Data Corporation, Minneapolis, Minn., a corporation of Minnesota
Filed Apr. 29, 1963, Ser. No. 276,309
9 Claims. (Cl. 192—56)

This invention relates to clutches and particularly to overload clutches designed to release the input driving force from the connected load when a predetermined torque occurs across the clutch.

The number of different mechanical and magnetic overload release devices that are commercially available and/or described in prior patents is too large for a discussion of each type. However, U.S. Patents No. 2,068,260 and 2,893,530 are particularly interesting, and they are discussed later. In general, though, the ultimate objective of an overload clutch is to disconnect the load from the driving force when the torque across the clutch reaches or exceeds the torque for which the clutch is designed or adjusted.

An object of my invention is to provide an overload release clutch whose construction enables the clutch to operate in a novel manner in achieving the ultimate purpose of releasing upon overload.

My overload release clutch can be thought of as a pair of serially connected clutches of the mechanical and magnetic types, to enable me to use each in the capacity for which it is inherently better suited. A mechanical clutch (e.g. tooth, pawl, etc.) handles heavy loads without slipping, generates no heat, etc.; while a magnetic clutch is more easily released, is quiet upon overload and engagement, provides better torque-overload control, etc. Although my overload release clutch can be considered as a pair of serially connected clutch devices, the embodiments of my invention are each constructed as a self-contained three-element overload clutch, where each element is coaxial and capable of rotational motion. Two of the elements (arbitrarily called first and second) are mechanically coupled while two of the elements (second and third) are magnetically coupled. The magnetic coupling functions upon overload to allow a limited amount of relative rotation between the second and third elements. This relative rotation is responsible for the mechanical decoupling of the clutch (first and second members). Thus, my clutch uses the magnetic feature only a torque limiter, relying on mechanical means to establish and break the drive connection between the driving and driven members.

One of the advantages derived from my arrangement is that upon release, the driving element or member can easily be made to be "free running," i.e. rotate freely when the clutch disengages. Another advantage is that my clutch can be made in simple designs, using a "break-away" magnet arrangement as a torque limiter so that for a given magnetic field strength, higher torque is possible than with the more common magnetic coupling designs which rely on magnetic shear forces and friction to transmit torque. This is discussed below.

My magnetic torque limiter can be constructed of a permanent magnet or an electromagnet attached to one of the clutch elements, e.g. the "third" element, and a magnetizable part (the armature) fixed to the second element. When the clutch is driven, the driving force is in a direction which tends to separate the magnet and armature, and the driving force is substantially parallel to the magnetic attraction holding the magnet and armature together. Thus, my magnetic torque limiter uses the magnetic "break-away" principle where the force tending to separate the armature from the magnet is a tangent force approximately (or exactly) parallel but in the opposite direction to the magnetic attraction between the magnet and armature.

One of the important objects of my invention is to provide an overload clutch which disengages quickly and with certainty when the rated torque of the clutch is exceeded. In the operation of most overload clutches a torque condition is experienced where there is uncertainty during disengagement, for instance if the torque remains approximately at the rated value. However, with my break away magnet arrangement, the magnetic attraction is greatest when the armature engages the magnet. At the instant that the torque across the clutch is sufficient to separate the magnet and armature a gap is introduced (or increased in some embodiments) so that the attraction force across the magnet and armature decreases instantly and sharply, allowing the separation to be more easily achieved and thereby causing the gap to increase with a corresponding further reduction in attractive force. The result is that with my clutch the torque limiter is engaged with maximum force during normal operation, and when an overload condition is experienced (armature and magnet just start to separate) the attraction decreases sharply and quickly. Another way to express this feature is this: while the clutch is in normal operation the torque rating is as designed. But as soon as the magnet and armature begin to separate, the gap introduced (or increased) between the magnet and armature drastically and suddenly reduces the attraction between the magnet and armature, and thus the separation becomes easier and easier, as though the torque rating of the clutch were much lower.

As indicated before, when my torque limiter experiences an overload, the second clutch member is rotated with respect to the third member (due to its mechanical coupling with the first or power-operated member). The relative rotation (a few or more degrees) is responsible for disconnecting the mechanical connection, e.g. removing a dog, teeth, pin, etc. from its coupling position between the first and second members. Thus, the clutch releases, i.e. no force is transmitted from the first to the second members.

There seem to be very few overload clutches using break-away magnets, as the large majority of overload clutches are mechanical or electromechanical, using means other than break-away magnets as the torque limiting device. Indeed, I am unaware of any free running overload clutches which use permanent magnets as a magnetic torque limiter U.S. Patent No. 2,068,260 discloses an electromagnetic release clutch capable of running freely upon release. However, the clutch disclosed in this patent is a two element device where the pole pieces must axially move relative to each other upon clutch-overload thereby introducing the requirement of axial as well as rotational motion of the magnets. Also, when the clutch is disengaged, some means must be provided for maintaining the drive and driven elements separated from each other, otherwise the clutch disclosed in this patent will probably attempt to reengage continually upon overload. In Patent No. 2,068,260 the required means to prevent the obvious chattering of the clutch are slip rings which also function as a switch for the coils of the electromagnet. Thus, the design of the clutch disclosed in this patent, although using break-away magnets, requires that the magnets be electromagnets. As will be seen later, I use permanent magnets as a torque limiting device to allow a mechanical element, for example a set of teeth or a tooth pawl, to decouple my clutch. Thus, I can use either electromagnets or permanent magnets in my clutch and I do not require electrical switching as in Patent No. 2,068,260.

Another patent disclosing a break-away electromagnet is U.S. Patent No. 2,893,530. This patent discloses a magnetic torque limiter with only two elements which are arranged to provide a torque limit for industrial machines, as power presses. One element is constructed as the rim of a wheel with short radial spokes, and the other element is constructed as the hub of a wheel, also with short radial spokes. The faces of the spokes of the two elements are magnetically coupled, and the rim spokes pull the hub spokes. Thus, upon overload, one set of spokes breaks away from the other set.

Although the clutch described in Patent No. 2,893,530 probably serves its intended purpose, it is not evident how the magnetic torque limiter disclosed in this patent can be constructed as a free running device which is understood to mean that upon release, the power input member is free to rotate continually. The spoke arrangement in Patent No. 2,892,530 does not allow free rotation in this manner, and in fact, rubber bumpers are provided for the break-away spokes when they contact the adjacent faces of the adjacent spokes upon separation from the electromagnets. Accordingly, the importance of a three-element clutch where two elements are mechanically coupled and two elements are magnetically or electromagnetically coupled (to act as a torque limiter) becomes further evident.

Another object of my invention is to provide a free running overload clutch having at least three elements or members when the first and second members are coupled by mechanical means and the second and third members are coupled to form a magnetic torque limiter which allows limited relative rotation between the second and third members upon clutch overload; and this limited relative rotation is used for the mechanical disengagement of the first and second members.

Another object of my invention is to provide an overload clutch as above, wherein the magnetic torque limiter includes at least one magnet and armature arranged to break-away from each other upon overload of the clutch thereby permitting relative rotation between two of the clutch members, and this relative rotation is used to cause a mechanical decoupling of two other elements of the clutch allowing it to disengage.

Permanent magnets require no electrical power supply, leads, slip rings, etc., and for that reason they are more desirable than electromagnets in clutches, except where continual or "in-use" adjustment must be made in the torque.

One of the difficulties in using magnets to transmit large torques is that they are heavy and large, particularly if large torques are to be transmitted. Therefore, an important feature of my invention is that I used a spring to supplement the magnetic attraction in such a manner that the spring can be responsible for any percentage of the required torque across the clutch to effect overload-release of the clutch. For instance, the spring can account for 90% of the torque and the magnet only 10%; or any other percentage of torque sharing. The advantages are that the clutch can now be made as a high torque device and still use the magnet as the ultimate torque sensing device. In the 90%–10% example, the effect is that I have the same break away advantage using a small magnet as would be obtained using a much larger and heavier magnet. When the full rated torque is experienced, the break away magnet functions quickly and with certainty in the manner described before.

Another advantage of using a spring in combination with a magnet is that the spring can easily be adjusted to change the torque rating of the clutch. Similar adjustments can be obtained by controlling the gap (if any) between the magnet and armature, for instance by a screw stop or a shim operative between the magnet and armature.

Accordingly a further object of my invention is to provide an overload clutch using a permanent magnet in combination with other means, as a spring stop, or a shim as a means to sense an adjusted, rated torque across the clutch and thereby increase the range of operativeness of a magnetic overload clutch.

Other objects and features of importance will become apparent in following the description of the illustrated form of the invention.

FIGURES 1–5

Figure 1:
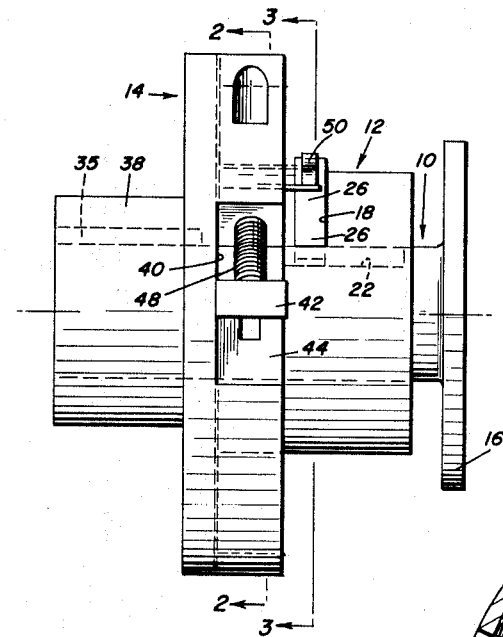
FIGURE 1 is a side elevation view of one form of my clutch.
Figure 5:
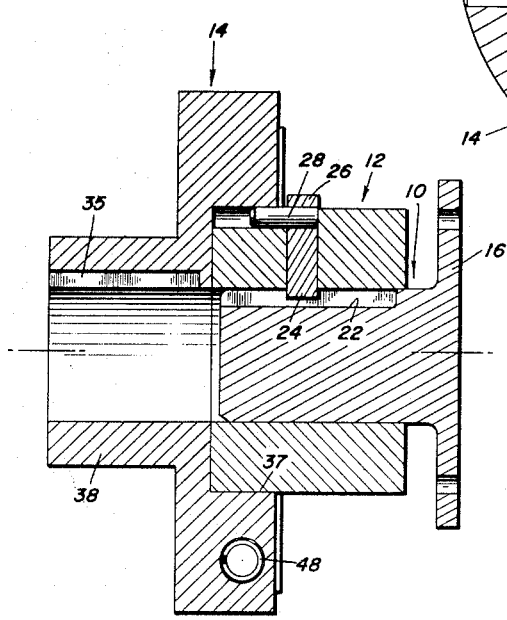
FIGURE 5 is a sectional view taken on the line 5—5 of FIGURE 2.

Although my clutches can be driven from either end, to avoid confusion I shall continue to refer to the drive element as the first member 10, the intermediate element as the second member 12, and the driven element (to which the external load is connected) as third member 14. As shown best in FIGURES 1 and 5 the three members are coaxial and capable of certain rotational movements, described later.

Figure 3:
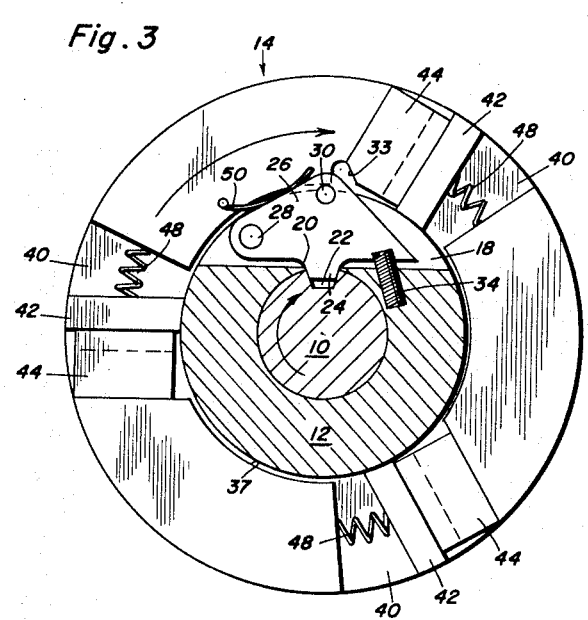
FIGURE 3 is a sectional view taken on the line 3—3 of FIGURE 1.

Member 10 is shown (FIGURES 1 and 5) as a shaft with flange 16 adapted to be connected to a power source, although any conventional coupler can be used in place of flange 16. Please refer to FIGURES 3 and 4. The inner part of member 10 is mounted in a central bearing formed in the second member 12 which has a chordwise slot 18 opening into the bearing by way of aperture 20. First member 10 has a spline 22 (or the equivalent) which receives the tooth 24 of pawl 26 through aperture 20 when the clutch is engaged (FIGURE 3). When the clutch is disengaged (FIGURE 4), tooth 24 is separated from spline 22, but how this is accomplished is described later.

Figure 2:
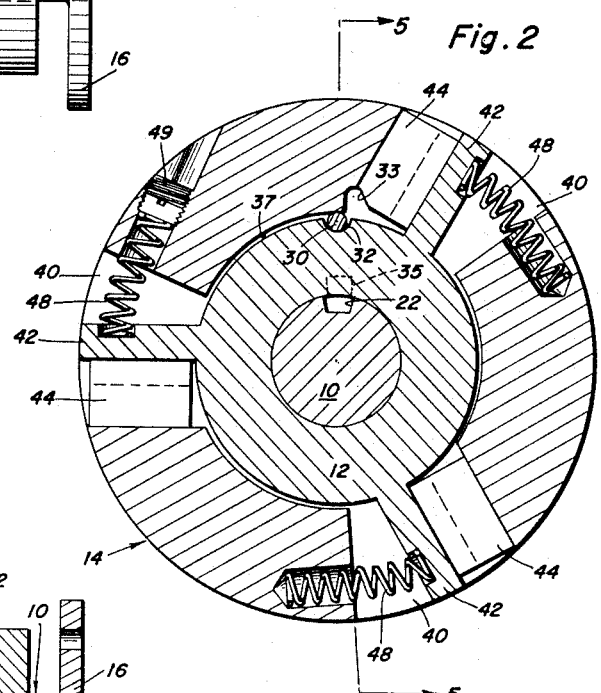
FIGURE 2 is a sectional view taken on line 2—2 of FIGURE 1.
Figure 4:
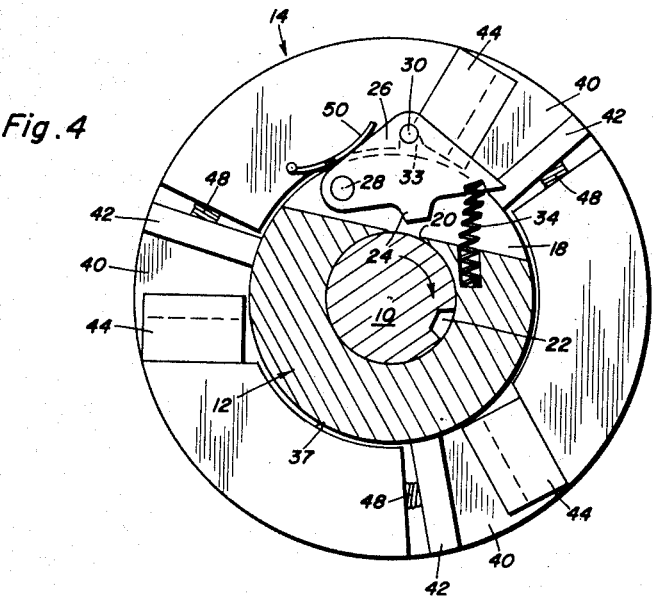
FIGURE 4 is a sectional view similar to FIGURE 3 but showing the clutch disengaged.

Pawl 26 is pivoted by pin 28 spannning the walls of slot 18 to enable the pawl to move to the positions shown in FIGURES 3 and 4 respectively, at which members 10 and 12 are respectively, mechanically coupled and uncoupled (by tooth 24). Pawl 26 has pin 30 which fits in recess 32 (FIGURE 2) of member 12 located near the adjacent surface of member 14. However, when members 12 and 14 rotate relative to each other a few degrees, pin 30 can move into clearance 33 in member 14, to enable the pawl to be centrifugally pivoted to the position (FIGURE 4) at which tooth 24 separates from spline 22. Spring 34 reacting on pawl 26 and member 12 can be used to supplement the centrifugal force which tends to swing pawl 26 outwardly.

Figure 5A:
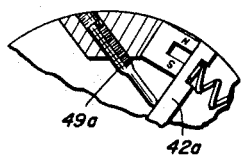
FIGURE 5a is a fragmentary view showing a modification.
Figure 5B:
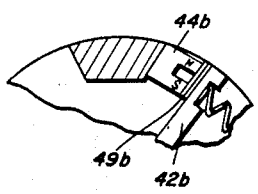
FIGURE 5b is a fragmentary view showing another modification.

Member 14 can be provided with any suitable means (shown schematically as spline 35) (FIGURES 1 and 5) for connecting to an external load, and/or the surface of collar 38 can be used for this purpose. Member 14 has a central bore 37 in which member 12 is disposed. There are circumferentially spaced openings 40 in one face of member 14 (FIGURE 2), and magnetic radial arms 42 fixed to member 12 are nested in openings 40. Magnets 44 are fixed, as by clamps, bolts, etc. (not shown), to one wall of each opening 40, and the poles of the magnets confront arms 42. Thus, arms 42 (functioning as armatures) and magnets 44 magnetically couple members 12 and 14. Springs 48 disposed in seats formed in the armatures or arms 42 and the opposite wall of openings 40, act to oppose the separation of arms 42 from magnets 44 and also as a means to reengage the arms and magnets after a torque-overload condition has caused the arms 42 to separate from magnets 44. The springs also provide a means to easily adjust the torque-rating of the clutch by adjusting the springs, e.g. by turning set screws 49 (only one shown in FIGURE 2) or by replacing springs 48 with weaker or stronger springs. An alternate method of adjusting the torque required across the clutch to effect clutch-release, is to provide and/or adjust the gap between one or more magnets 44 and arms 42. For example, I can use a stop such as set screw 49a (FIGURE 5a) threadedly connected to member 14 and having an end against which arm 42a abuts. A shim 49b (FIGURE 5b) between magnet 44b and arm 42b will serve the same purpose. It is understood that for gap adjustment, the shim will be replaced with a thicker or thinner shim 49b.

OPERATION, FIGURES 1–5

Assume that the first member 10 is driven by a power source, and that a load is connected to collar 38, and that the clutch is engaged (FIGURE 3). Torque is transmitted from member 10 to member 12 by being mechanically locked thereto through the pawl tooth 24. The direction of rotation is clockwise, whereby torque is transmitted from member 12 through its arms 42 to output or load-connected member 14 via magnets 44. The force across arms 42 and magnets 44 is in a direction tending to pull or "break" the arms away from the magnets i.e. substantially parallel and opposite to the magnetic attraction between arms 42 and magnets 44. The effect of springs 48 is to oppose the tendency of arms 42 to separate from magnets 44.

Now assume an overload. Member 14 offers too high a resistance to turning or better, for illustrative purposes, member 14 stops. Members 10, 12 are still driven by the motor (or the equivalent). These members rotate (as a unit) clockwise with respect to member 14, causing arms 42 to break away from magnets 44 and against the compression of springs 48. An important feature of my clutch is that springs 48 tend to hold arms 42 in engagement with magnets 44 upon initial overload, whereby the springs can be selected (or adjusted) to oppose the separation of arms 42 and magnets 44 with a force equal to any percentage of the full clutch rating. For instance, if the torque rating of the clutch is 100 foot pounds, the springs 48 can be selected (or adjusted) to accept 90 foot pounds before they can compress to allow the arms (42)-to-magnets (44) coupling to experience the load. Thus, the magnetic attraction need only be equivalent to 10 foot pounds of torque (in the arbitrarily selected example) for a clutch having a 100 foot pound rating.

However, when there is relative rotation (due to overload) between members 10–12 and member 14, the relative rotation positions pawls 26 (because it is rotated in unison with member 12 and with respect to member 14) so that its spring 34 (if one is used) and/or centrifugal force moves the pawl pivotally outward (FIGURE 4) with pin 30 entering clearance 33. The effect of this is that tooth 24 withdraws from spline 22. The withdrawal tooth 24 mechanically decouples member 10 from member 12 and thereby allows member 10 to rotate free of member 12. As a result, this mechanically releases the clutch under the overload condition detected by the magnetic torque limiter.

When the overload condition is corrected, pawl 26 can be manually (or otherwise, not shown) pushed inward while member 10 rotates with respect to member 12 (or vice versa). Alternatively (or in addition) a weak spring 50 (FIGURES 3 and 4) attached to member 14 and bearing on pawl 26 can be relied on to resiliently return pawl 26 to the position shown in FIGURE 3. Since the overload condition is assumed corrected (when the pawl is returned to a position at which tooth 24 engages spline 22 through aperture 20), arms 42 again engage and hold against magnets 44. Thus, the magnetic portion of my clutch is again prepared for further operation.

FIGURES 6–8

Figure 6:
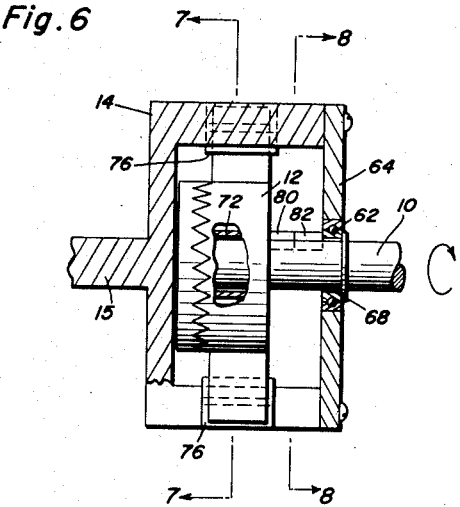
FIGURE 6 is a sectional view of another form of my clutch, taken on the line 6—6 of FIGURE 7.
Figure 6A:
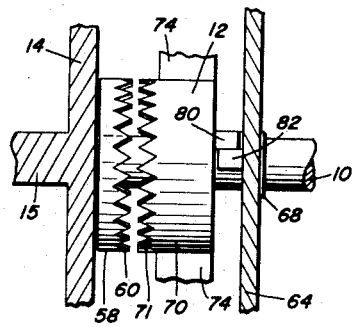
FIGURE 6a is a fragmentary view showing the clutch of FIGURE 6 disengaged.
Figure 7:
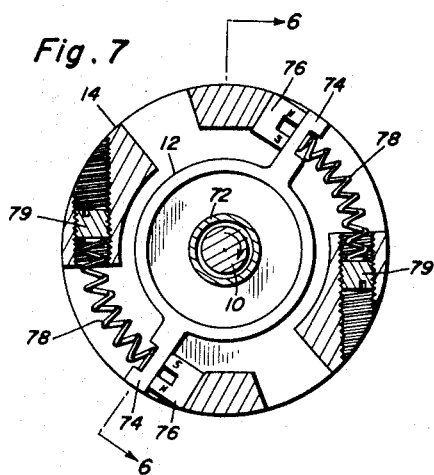
FIGURE 7 is a sectional view taken on the line 7—7 of FIGURE 6.
Figure 8:
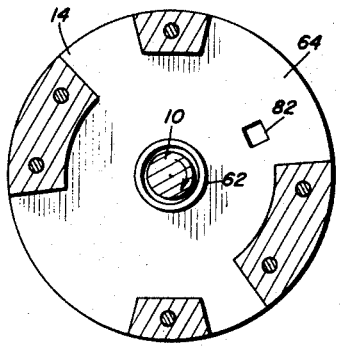
FIGURE 8 is a sectional view taken on the line 8—8 of FIGURE 6.

In the embodiment of FIGURES 6–8, the first (power input) member is indicated at 10, the second or intermediate member at 12, and the third or power output member at 14. Member 10 is composed of a shaft having a clutch element 58 as its inner end, and mounted coaxially with the shaft 15 of output member 14. Clutch member 58 is a disc or shallow cup provided with teeth 60 at its periphery. The coaxial mounting can be achieved in a number of ways, one of which is to use bearing 62 (FIGURE 6) in the front plate 63 of member 14, together with snap rings (one shown at 68, FIGURES 6 and 6a) in grooves (not shown) in shaft 10 which confront the faces of the inner race of bearing 62.

The third member 14 is constructed to be very similar to member 14 of the embodiments of FIGURES 1–5. The principal differences is plate 64 (or a spider, not shown) which is attached to one face of member 14.

Intermediate member 12 is composed of a body having a cup shape to define mechanical clutch element 70 having teeth 71 to engage the aforementioned teeth 60 (FIGURES 6 and 6a). (For a clutch that always engages at the same relative position, as in FIGURE 1, each set of teeth 60 and 71 can each be replaced by a single tooth.) An internal structure supports bearing 72 (FIGURES 6 and 7) through which shaft 10 extends. Radial arms 74 are attached to the intermediate or second member 12 in the same manner as in the embodiment of FIGURES 1–5 and, in fact, arms 74 cooperate with permanent magnets 76 in a manner precisely the same as the corresponding arms 42 and magnets 44 of the first embodiment. Springs 78 reacting on arms 74 and the third member 14 are identical in function and arrangement to springs 48. Torque rating is adjustable by screws 79 (FIGURE 7) and/or by gap adjustment shown in FIGURES 5a and 5b and described before.

In this form of my invention I have interposers 80 and 82 attached respectively to second member 12 and third member 14. Specifically, interposer 80 is secured to the face of clutch member 70 opposite to its teeth, and interposer 82 is fixed to the inner face of plate 64. As will be described below, when interposers 80, 82 are in the relative position shown on FIGURE 6, my clutch is engaged, and when the interposers slip off each other (FIGURE 6a) my clutch is disengaged.

OPERATION, FIGURES 6–8

Assume that my clutch is engaged and is transmitting torque from member 10 (FIGURE 6) to the output shaft of member 14. The torque is transmitted in the following manner: Shaft 10 is rotated (clockwise) (FIGURES 7 and 8) and the mechanical coupling members 58, 70 are drivingly connected to each other by the engaging teeth 60 and 71. Force is transmitted by member 70 across the torque limiter (FIGURE 7) consisting of arms 74, their springs 78, and magnets 76 which are fixed to the power output member 14.

Upon overload of the clutch (assume that member 14 is stopped while the input or first member 10 is still driving), arms 74 (FIGURE 7) begin to separate from magnets 76 (with the same cooperative action of springs 78 as described in connection with spring 48 of FIGURES 1–5) thereby causing relative rotation of members 10, 12 (as a unit) with respect to member 14. This relative rotation of a few degrees or more moves interposer 80 with respect to interposer 82 so that intermediate member 12 can move axially (FIGURE 6a) by the action of the teeth 60, 71 tending to disengage. When these teeth become fully disengaged (FIGURE 6a) first member 10 and its clutch member 58 rotate freely with respect to the remainder of the clutch. For reengagement, first member 10 is stopped and a tool (e.g. a screw driver) is inserted between the front plate 64 (FIGURE 6a) and member 12, and member 12 is moved into engagement with the teeth of member 10 (FIGURE 6).

It is understood that the description and drawings are given by way of example, and that many changes and alterations can be made without departing from the protection of the following claims. For example, the clutch can be at least partially enclosed in a casing which prevents the three elements from axially separating. Circular keys, locking rings, etc. can be used for the same purpose, as is well known in the art.

I claim:

1. A free running overload clutch comprising a first rotary member, a second rotary member, and a third rotary member, said members arranged to transmit torque, torque responsive means coupling said second and third members and responsive to torque overload to allow relative rotation between said second and third members, said torque responsive means including a magnet and an armature attached to said second and said third members and arranged to break away from each other upon clutch overload, and resilient means acting between said second and said third members in a direction which aids said magnet and opposes separation of said armature and magnet, and coupling means coupling said first member to said second member and responsive to said relative rotation due to torque overload for decoupling said first and second member and thereby permit said first member to rotate free of said second member.

2. An overload clutch comprising a first member, a second member, and a third member, said members being arranged for rotation, a magnetic torque limiting means coupling said second and third members and permitting relative rotation therebetween in response to torque overload, said magnetic torque limiting means including a magnet and an armature secured to said second and said third members and engaging each other, said magnet and armature separating from each other in a direction substantially parallel to the magnetic attraction therebetween upon clutch overload, resilient means acting between said magnet and armature and transmitting the major portion of the total torque required for overload, and means coupling said first and second members and responsive to said relative rotation to uncouple said first and second member.

3. A free-running overload clutch comprising a first rotary member, a second rotary member, and a third rotary member, said members arranged to transmit torque, torque responsive means coupling said second and said third members and responsive to torque overload to allow relative rotation between said second and said third members, said torque responsive means including a permanent magnet and an armature connected to said second and said third members and arranged to separate from each other upon clutch overload thereby allowing said relative rotation, coupling means coupling said first member to said second member and responsive to said relative rotation for decoupling said first and second members thereby permitting said first member to rotate free of said second member, said coupling means including a pawl movably connected with said second member and having a tooth, said first and said second members having engagement means with which said tooth engages to couple said first and said second members, and means providing a clearance for a part of said pawl to enable said pawl, upon clutch overload, to move with respect to said first and said second members in a manner such that said pawl separates from engagement with said engagement means and enters said clearance owing to said relative rotation which registers said clearance with said pawl part.

4. An overload clutch comprising a first member, a second member, and a third member, said members being arranged for rotation, a magnetic torque limiting means coupling said second and said third members and permitting relative rotation therebetween in response to torque overload, said magnetic torque limiting means including a magnet and an armature secured to said second and third members and engaging each other, said magnet and said armature separating from each other in a direction substantially parallel to the magnetic attraction therebetween upon clutch overload, means coupling said first and said second members and responsive to said relative rotation to uncouple said first and second members, said coupling means including a mechanical element, said first and said second members having interlocking means to which said mechanical element is engaged, and means movably connecting said mechanical element to said second member for movement in a direction to separate said interlocking means in response to said relative rotation.

5. An overload clutch comprising a first member, a second member, and a third member, said members being arranged for rotation, a magnetic torque limiting means coupling said second and said third members and permitting relative rotation therebetween in response to torque overload, said magnetic torque limiting means including a magnet and an armature connected to said second and said third members and adapted to separate upon clutch overload forces sufficient to separate the magnet and armature, and resilient means operative between said armature and said third member to oppose the tendency of the magnet and armature to separate, and means coupling said first and said second members and responsive to said relative rotation to uncouple said first and second member.

6. The subject matter of claim 5 wherein said resilient means including spring of a strength to accept a major part of the torque tending to overload the clutch.

7. The subject matter of claim 6 and means for adjusting said spring.

8. An overload clutch comprising a self-contained unit having a first member, a second member, and a third member arranged for rotation, magnetic torque limiting means coupling said second and said third members and permitting relative rotation therebetween in response to torque overload, said torque limiting means including a magnet and an armature engaged therewith, said magnet and said armature being attached to said second and said third members respectively, mechanical coupling means within said unit and connected to said first and said second members for coupling said first and second members, and said mechanical coupling means being responsive to said relative rotation to uncouple said first and said second members.

9. The clutch of claim 8 wherein said magnet is a permanent magnet, and means for adjusting the required torque at which said armature and permanent magnet separate to permit said relative rotation.

References Cited by the Examiner

UNITED STATES PATENTS

| | | | |
|---|---|---|---|
| 2,068,260 | 1/37 | Biggert | 192—56 |
| 2,796,160 | 6/57 | Harmes | 192—56 |
| 2,893,530 | 1/59 | Curtner | 192—150 |
| 3,166,170 | 1/65 | Forster et al. | 192—56 |

FOREIGN PATENTS 416,840  7/25  Germany.

DAVID J. WILLIAMOWSKY, *Primary Examiner.*